May 10, 1966 D. J. HUHN 3,250,574
FORAGE BLOWER

Filed March 26, 1965 2 Sheets-Sheet 1

INVENTOR:
DONALD J. HUHN

BY: James E. Nilles
ATTORNEY

May 10, 1966 D. J. HUHN 3,250,574
FORAGE BLOWER
Filed March 26, 1965 2 Sheets-Sheet 2
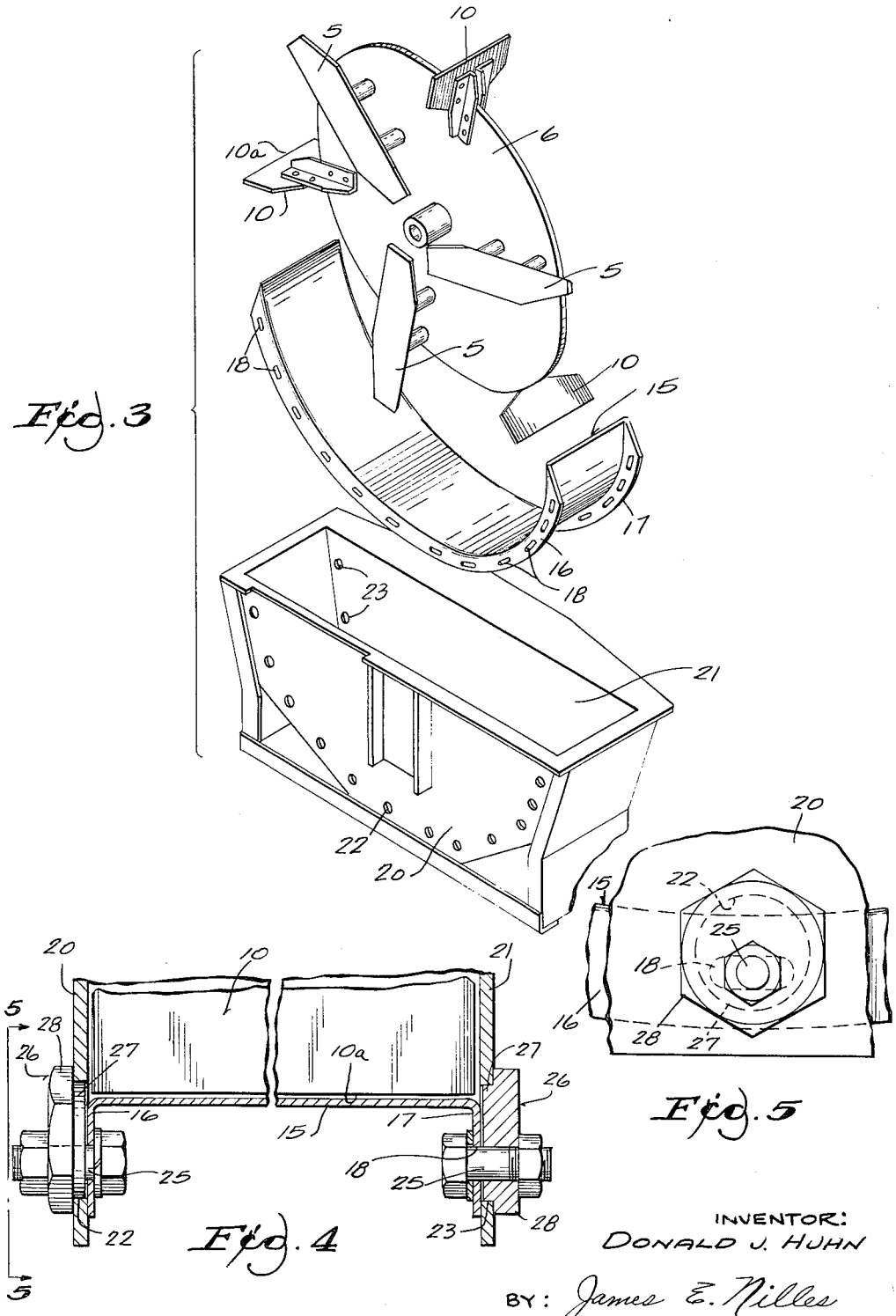
INVENTOR:
DONALD J. HUHN
BY: James E. Nilles
ATTORNEY United States Patent Office 3,250,574
Patented May 10, 1966

3,250,574
FORAGE BLOWER
Donald J. Huhn, West Bend, Wis., assignor to Gehl Bros. Manufacturing Company, West Bend, Wis., a corporation of Wisconsin
Filed Mar. 26, 1965, Ser. No. 442,929
8 Claims. (Cl. 302—37)

This invention relates generally to agricultural machinery such as harvesters, silo blowers, or the like and finds particularly utility in a forage harvester in which the crop is cut into small pieces and blown into a receptacle, for example, a trailing wagon. More specifically, this invention relates to an improved means for adjusting the rim sheet of the blower housing for such a harvester.

In blower mechanisms of the type to which the present invention relates, a large rotor or flywheel is enclosed in a generally circular housing and, if it also is to perform a cutting function, carries a series of knife blades for cooperation with a stationary shear bar located adjacent the inlet so as to finely cut the forage as it enters the housing. In any event, the rotor has a series of fan plates adjacent its periphery that act to create a current of air which, together with a throwing action of the fan plates, forcibly discharges the material into a tangential discharge conduit.

In these mechanisms, it is necessary for proper delivery that the outermost edge of the fan plates be located precisely with respect to the inner surface of the curved, outer wall of the housing. This peripheral wall of the housing is referred to as the blower rim sheet, and the clearance between it and the fan tips, for best delivery, is between 1/16″ minimum to 1/8″ maximum. As the fan tips become worn, poor delivery even with increased power will result, unless the rim sheet is adjusted to the proper position with respect to the fan tips.

Due to the nature of these harvesters, the adjustment of this rim is a difficult task, not only because of the space limitations and difficult accessibility, but also because of the accuracy with which this adjustment must be made. The rim sheet preferably should be adjustable for any individual segment of its length, and not merely as an entire sheet, in order to insure optimum conditions.

Accordingly, the present invention provides an improved means for adjusting the rim sheet of a forage blower relative to the fan tips, and at any individual location along the length of the rim sheet.

A more specific aspect of the present invention relates to an adjusting means of the above type which provides individual cam mounts for each side of the rim sheets and along the length thereof. The arrangement is such that each cam mount can be readily adjusted from the outside of the blower housing and by the use of only a wrench which does not require much space to effect the adjustment. The wrench-operated, eccentric cam adjustment provides good leverage in a limited space which cannot accommodate the prior art lever or jack, force applying devices.

These and other objects and advnatages of the present invention will appear hereinafter as this disclosure progresses, reference being had to the accompanying drawings, in which:

FIGURE 3 is a perspective, exploded view showing the lower portion of the housing, the lower rim sheet which is adjustably mountable therein, and the rotor or flywheel;

FIGURE 4 is an enlarged, sectional view taken along line 4—4 in FIGURE 2; and

FIGURE 5 is a fragmentary view taken from line 5—5 in FIGURE 4.

Figure 1:
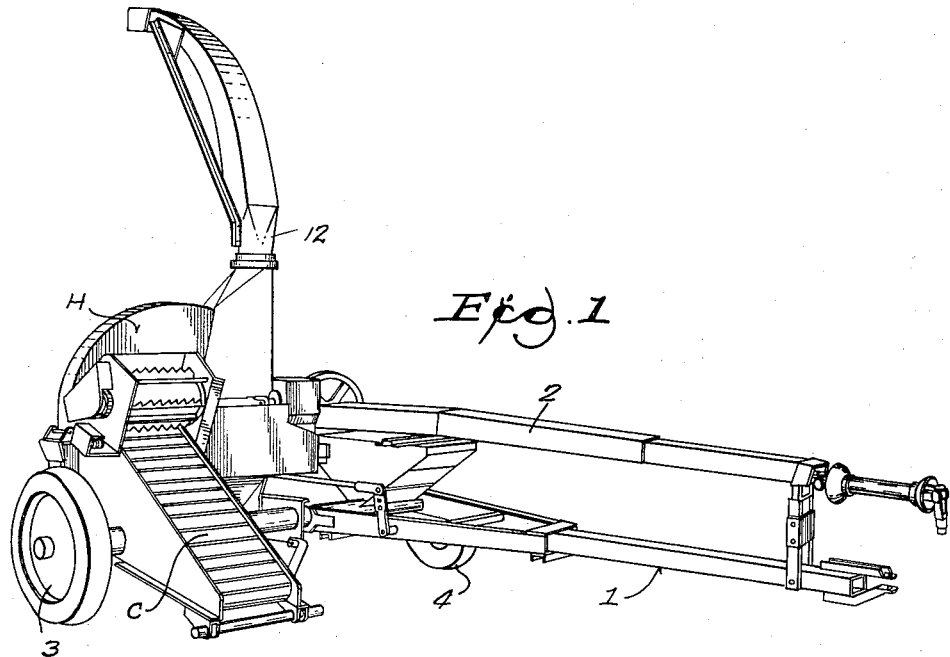
FIGURE 1 is a perspective view of a forage harvester in which the present invention has been incorporated, certain parts being shown as broken away, removed, or in section, for clarity in the drawings, and other conventional parts being shown more or less schematically in form.
Figure 2:
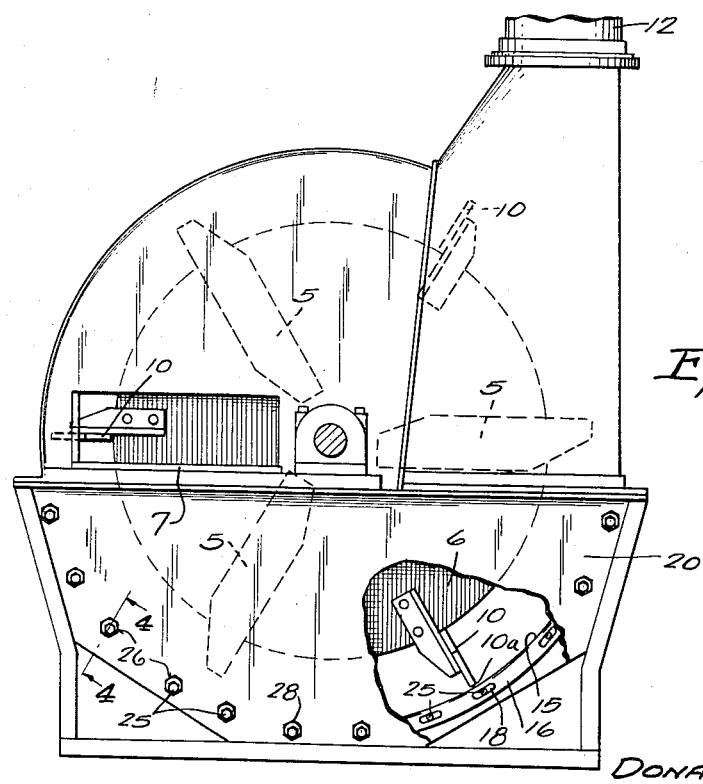
FIGURE 2 is an enlarged, front elevational view of the blower housing shown in FIGURE 1, certain parts shown as being broken away.

Referring in greater detail to the drawings, the invention has been shown for purposes of illustration as being embodied in a mobile forage harvester which is adapted to be propelled by a tractor (not shown) or the like through the drawbar 1 along which is supported the conventional power shaft 2. The harvester includes the conventional parts such as ground wheels 3 and 4 which support it for travel over the forage crop to be cut by a sickle (not shown), conveyed into the housing H by the conveyor C where it is comminuted by the action of the knife blades 5 rigidly secured to the flywheel 6 and which blades cooperate with the fixed shear bar 7 on the inside of the housing. Thus, the crop is finely chopped as it enters the housing, and the fan plates 10 also fixed around the periphery of the flywheel act in cooperation with the housing to forcibly convey the chopped material out of the housing by a blowing and batting action through the tangentially arranged discharge conduit 12, all in the conventional and well-known manner.

The flywheel is driven at a high speed by power from the P.T.O. shaft 2 in the conventional manner. The outer edge 10a of the fan plates 10 must be accurately positioned with respect to the inside, curved wall of the housing in order to efficiently cause the material to be conveyed without excessive power loss and without plugging of the housing or discharge conduit. Furthermore, considerable wear takes place on the curved wall of the housing, and this wall must be frequently replaced. For these reasons, a replaceable and adjustable curved wall is provided within the housing. This wall is referred to in this art as the rim sheet, and it is to this sheet that the present invention is directed.

Generally speaking, this rim sheet may completely line the inside of the housing, that is to say, for the entire length of travel of the cut material therein. This sheet may be formed into separate sections, such as an upper rim sheet and a lower rim sheet. Most of the material, however, travels only a short distance within the housing, namely, from the shear bar and then directly to the outlet conduit. As this is usually in the lower portion of the housing where the wear occurs more quickly and where the space between the fan plates and rim sheet is the most critical, the invention will be shown and described only in connection with the lower rim sheet.

The lower rim sheet 15 is shown here for illustrative purposes as being generally semi-circular in shape and having radially outwardly extending flanges 16 and 17, one formed integrally along each side thereof. A series of arcuate slots 18 are punched or otherwise formed along the length of each flange at spaced intervals. These slots are arranged as arcs with the axis of flywheel rotation as the center for the radius by which they are formed. Furthermore, these slots in the rim sheet flanges are of such width in a radial dimension so that they snugly receive the bolt means 25, for purposes that will appear.

The housing H includes a front wall 20 and a rear wall 21 which are arranged in parallelism and have a series of aligned holes 22 and 23, respectively, formed in an arc adjacent their outer, lower edge. These holes are also aligned with the adjacent and corresponding slots 18 in the flanges of the rim sheet 15.

A cam mount 26 is provided for securing the rim sheet to the housing walls so that any small section of length of the rim sheet can be adjusted relative to the walls, more particularly, relative to the radial outer edge of the fan plates, as follows.

These cam mounts each include a circular disc 27 which is of such a size so as to be snugly but rotatably mounted in the holes 22, 23 of the parallel side walls. The mounts also include a non-circular shape portion which is shown here in the form of a hexagonal plate 28. These circular and non-circular parts are welded or otherwise secured together so as to form a sharp shoulder therebetween to provide a good bearing surface in the walls and rim sheet. It will be noted that the hex plate 28 is larger than the hole in the wall and abuts against the outside thereof. This hex piece may be of other forms, whereby it can be grasped by a wrench or the like so that it can be forcibly turned.

As clearly shown in FIGURE 5, the circular disc is mounted eccentrically on the bolt means to provide a cam action when it is rotated along with the hex plate. This permits an accurate and positive adjustment of the rim sheet, through the slotted opening and bolt connection, and in a radial direction from the rotor, more particularly, from the outer edge of the fan plates.

In this manner, the proper spacing between any portion of the rim sheet and the fan blades can be easily and quickly obtained for maximum material conveying efficiency.

Various modes of carrying out the invention are contemplated as being within the scope of the following claims particularly pointing out and distinctly claiming the subject matter which is regarded as the invention.

I claim:

1. A crop handling blower mechanism of the type having a generally cylindrical housing with a material inlet and outlet and including two vertical side walls arranged in parallelism and with a curved rim sheet therebetween, a flywheel rotor rotatably mounted within said housing and having a plurality of fan plates mounted adjacent its periphery, said plates having outer fan edges which cooperate with said rim sheet to cause material to be conveyed within said housing by rotation of said rotor, said curved rim sheet having a radially outwardly extending flange along each side thereof for abutting relationship against its respective adjacent inner surface of said side walls, said flanges and side walls having a series of aligned openings therethrough and at circumferentially spaced locations, bolt means extending through said openings, said openings in said flanges being of such radial dimension so as to snugly embrace said bolt means, and said openings in said side walls being circular and larger than the diameter of said bolt means, and eccentric cam means snugly mounted on said bolt means nad for rotationally supporting said bolt means in said circular openings, said cam means including a portion located on the outside of said walls and adapted to be engaged by a tool for turning said cam means in said circular openings and thereby radially shifting said rim sheet.

2. Mechanism as defined in claim 1 further characterized in that said portion is located outside said side walls and is in abutting engagement therewith to hold said cam means captive in said side walls and to provide stability and smooth turning movement for said cam means.

3. Mechanism as defined in claim 2 further characterized in that said cam means includes a circular disc rotatably mounted in said circular opening, said disc being rigidly fixed to said outer portion.

4. Mechanism as defined in claim 1 further characterized in that said outer portion is a flat plate having a periphery of non-circular shape, and said bolt means includes an adjustable nut located on the outside of said housing.

5. A mobile forage harvester comprising, a generally cylindrical housing with a material inlet and a shear bar located adjacent thereto, a tangentially arranged outlet conduit circumferentially spaced from said inlet, two vertical side walls arranged in parallelism and with a generally semi-circular rim sheet located between the lower portion of said walls, a flywheel rotor rotatably mounted within said housing and having a plurality of radially outer fan edges which cooperate with said rim sheet to cause material to be conveyed within said housing by rotation of said rotor, said semi-circular rim sheet having a radially and outwardly extending flange along each side thereof and abutting tightly against its adjacent side wall, said flanges and side walls having a series of aligned openings therethrough and at circumferentially spaced locations, bolt means extending through said openings, said openings in said flanges being of such radial dimension so as to snugly embrace said bolt means, and said openings in said side walls being circular and larger than the diameter of said bolt means, and eccentric cam means snugly mounted on said bolt means and for rotationally supporting said bolt means in said circular openings, said cam means including a portion located on the outside of said walls and adapted to be engaged by a tool for turning said cam means in said circular openings and thereby radially shifting said rim sheet for adjustment relative to said fan edges.

6. Mechanism as defined in claim 5 further characterized in that said portion is located outside said side walls and is in abutting engagement therewith to hold said cam means captive in said side walls and to provide stability and smooth turning movement for said cam means.

7. Mechanism as defined in claim 6 further characterized in that said cam means includes a circular disc rotatably mounted in said circular opening, said disc being rigidly fixed to said outer portion.

8. Mechanism as defined in claim 5 further characterized in that said outer portion is a flat plate having a periphery of non-circular shape, and said bolt means includes an adjustable nut located on the outside of said housing.

References Cited by the Examiner

UNITED STATES PATENTS 884,016 4/1908 Groves _____ 302—37

FOREIGN PATENTS 569,171 10/1930 Germany.
26,130 11/1906 Great Britain.

EVON C. BLUNK, *Primary Examiner.*

ANDRES H. NIELSEN, *Assistant Examiner.*